(12) United States Patent
Todd

(10) Patent No.: US 6,380,928 B1
(45) Date of Patent: Apr. 30, 2002

(54) DYNAMICALLY CONFIGURABLE ELECTRONIC SURVEY RESPONSE ALERT SYSTEM

(76) Inventor: Kenneth J. Todd, 1770 S. Lincoln St., Denver, CO (US) 80210

( * ) Notice: Subject to any disclaimer, the term of this patent is extended or adjusted under 35 U.S.C. 154(b) by 0 days.

(21) Appl. No.: 09/577,189

(22) Filed: May 23, 2000

Related U.S. Application Data

(63) Continuation-in-part of application No. 09/001,945, filed on Dec. 31, 1997, now abandoned.

(51) Int. Cl.$^7$ ................................................ G09G 5/00
(52) U.S. Cl. ........................ 345/169; 345/25; 345/172
(58) Field of Search ........................ 345/169, 25, 172; 434/262; 395/609; 705/10, 11, 15; 361/600; 364/710.1; 235/375

(56) References Cited

U.S. PATENT DOCUMENTS

| | | | | |
|---|---|---|---|---|
| 4,355,372 A | * | 10/1982 | Johnson et al. ............. 364/900 |
| 4,569,421 A | * | 2/1986 | Sandstedt ..................... 186/39 |
| 4,603,232 A | * | 7/1986 | Kurland et al. .......... 379/92.04 |
| 4,863,384 A | * | 9/1989 | Slade ......................... 434/236 |
| 5,572,653 A | * | 11/1996 | DeTemple et al. ........... 345/501 |
| 5,704,029 A | * | 12/1997 | Wright, Jr. .................. 707/505 |
| 5,734,890 A | * | 3/1998 | Case et al. ................... 395/605 |
| 5,740,035 A | * | 4/1998 | Cohen et al. ............ 364/401 R |
| 5,801,664 A | * | 9/1998 | Seidensticker ................. 345/2 |
| 5,842,195 A | * | 11/1998 | Peters et al. .................... 707/1 |
| 5,870,030 A | * | 2/1999 | DeLuca et al. ......... 340/825.44 |
| 6,014,668 A | * | 1/2000 | Tabata et al. ................. 707/10 |
| 6,154,745 A | * | 11/2000 | Kari et al. ................... 707/100 |

* cited by examiner

Primary Examiner—Chanh Nguyen
Assistant Examiner—Fritz Alphonse
(74) Attorney, Agent, or Firm—Rader, Fishman & Grauer PLLC; Lee G. Meyer

(57) ABSTRACT

An improved portable, electronic survey and satisfaction questionnaire device adapted for use in the hospitality industry, and more particularly restaurants, which incorporates a transceiver to signal restaurant personnel upon the achievement of certain threshold, pre-programed, criteria allowing contact with the customer prior to exiting the hospitality establishment. The device electronically presents a series of questions, records the answers, and stores and/or transmits all or a portion of the survey response. Preferably, the transceiver communicates with a silent pager, worn by a restaurant manager, if certain threshold responses are registered.

11 Claims, 11 Drawing Sheets

DYNAMICALLY CONFIGURABLE ELECTRONIC SURVEY RESPONSE ALERT SYSTEM

The present application is a Continuation-in-Part of application Ser. No. 09/001,945 filed Dec. 31, 1997, for a Dynamically Configurable Electronic Comment Card.

BACKGROUND OF THE INVENTION

1. Field of the Invention

The parent application, which is incorporated by reference herein in its entirety, discloses a portable, hand-held, electronic survey device adapted for use in the hospitality industry, and more particularly restaurants. The instant invention is broadly directed to an interactive, portable, hand-held, electronic survey and satisfaction questionnaire device having a remote, realtime, signaling capability in response to preprogrammed and realtime stimuli or thresholds adapted for use in the hospitality industry, and more particularly restaurants.

2. Related Art

In many industries, obtaining feedback from customers is important to the success of the business. This is especially critical in the service industries, where the perceived quality of the provided service may be the only distinction between two service providers. Due to both the high level of competition and the variety of alternatives available to the consumer, the restaurant industry is driven largely by customer satisfaction.

Thus, many methods have been devised to gauge customer satisfaction through customer survey information, especially for use in restaurants. These have met with limited success, due in part to the competing goals and constraints imposed on the process. Ideally, surveys generate accurate results when every customer responds. While this is seldom achieved, obtaining responses from as large a percentage of the sampled population as possible is highly desirable. In an attempt to achieve this goal, the survey must be either presented directly to each patron, or made so conspicuous that they will notice it spontaneously and consider completing the survey. Opposing this goal, however, is the constraint that the survey technique employed must not negatively impact the customer's dining experience by taking too much time, being intrusive, being too complex, or having some other adverse attribute. This not only adds to the negative experience but skews the results. In an attempt to balance these demands, the survey device should be conspicuous, but not obnoxious or demanding; easy to use; quick to use; and comprehensive. Preferably, the survey questions could also be changed and processed easily. It would also be advantageous if certain responses could be instantaneously and remotely conveyed to management in an unobtrusive manner, so that immediate interaction with the customer would be possible and potentially adverse situations could be remedied in a timely manner, prior to the customer's departure from the dining establishment.

Among the most common techniques currently employed is the use of the paper comment form. Often post-card sized, it is made available to the diner to be filled out and returned to a box for collection. This approach, while widely used, suffers from several drawbacks. Primary among these is the low response rate. These are passive forms, which are often presented on the table and frequently ignored or set aside by customers. If arranged on the table near other items, such as the sugar tray, salt and pepper shakers, and the like, the surveys may not even be seen by the diner. Further, filling out such cards requires the availability of a writing instrument, which usually is not supplied. Therefore, unless the diner has a pen or pencil with them, the card cannot be filled out. Moreover, such paper comment cards are not interactive and cannot supervise or guide the respondent in filling out the survey. Those surveys that are completed and returned may be difficult or slow to process. Typically, the data must be hand-entered into a computer for processing. Occasionally, machine-scannable, "check-box" forms are used, but even these are error prone. Even if fully automated, such procedures may require several days or weeks to process the surveys and return the results to the restaurant. While this may be acceptable for long-term forecasting, it is inadequate for identifying and addressing more immediate concerns or successes. Further, gathering information about a recent, or perhaps temporary, change involves the expense of printing a new set of forms, and, if scanned, updating the processing program.

More importantly, the prior art devices, whether paper or electronic, are oriented toward statistical, after-the-fact survey techniques. Whether the information is collected while the customer is in the establishment, or after he/she has left, the processing and evaluation of the survey merely indicates trends or identifies sources of dissatisfaction after the customer has left the establishment. While valuable as information to management, this does not provide the means to interact with the customer who has had a good or a bad experience prior to leaving the restaurant.

It is well known that the best advertising, good or bad, is word of mouth. This is especially true in the hospitality industry. Thus, if a customer has a bad experience, prior art surveys can capture that data in an effort to alter subsequent events, but the customer who has had the negative experience more than likely will not return and will share this bad experience with numerous acquaintances. This "negative" word of mouth advertising is hard to overcome even if the experienced problem is rectified immediately for the benefit of other customers.

Several electronic survey devices have been developed and patented to address some of the above mentioned problems. The use of electronics holds the promise of faster processing and fewer errors, especially where separate data-entry is avoided. However, nothing in the prior art provides for real time, self-administered, customer satisfaction survey systems, methods, or devices, or, more specifically, devices which signal a programmed condition to the manager or other service attendant so that intervention can proceed prior to the customer exiting the establishment.

U.S. Pat. No. 5,038,367 to Casey is a simple device useful for very basic surveying. It is a stationary device intended to be placed in the lobby of a bank, or similar location, to survey customers as they are leaving. A single question is presented on a printed placard, and the customer is given the option of answering "yes" or "no" via two buttons on the face of the device.

U.S. Pat. No. 4,345,315 to Cadotte et al presents a more flexible solution than the Casey device in that it can present several questions and accept three or more alternative answers to each question. Again, the answers are presented on written labels which are inserted into the device in alignment with the response keys. Like the Casey device, this device is relatively large and is intended to be placed in a fixed location within a restaurant and used as the customer is departing.

U.S. Pat. No. 4,234,933 to Adelson et al discloses an early device which uses a microprocessor-controlled slide projector to present a series of questions and accepts answers from a keyboard. It is not generally applicable to customer surveys within service establishments.

U.S. Pat. No. 3,747,228 to Yamamoto is an automated interviewing device which electronically stores questions and responses in audio format and provides for electronic control of question presentation and response recordation. This device is not generally applicable to customer surveys. It is a large device intended for lengthy questions and answers.

U.S. Pat. No. 5,740,035 to Cohen et al discloses systems, methods, and devices for electronic, self-administered surveys which generate market information for later use by advertisers, advertising agencies, and broadcasters. The invention is directed toward the storage of survey data in a plurality of survey devices and the subsequent upload of survey data from those devices to a centralized data processing unit. The focus of the invention is the historical and statistical value of the survey data compiled. The device cannot be used as a real time tool for determining and signaling or triggering a signal upon the happening of a preprogrammed event.

It would, therefore, be advantageous to provide an interactive, self-administered survey device which is easy to use, which is not perceived by survey respondents as tedious, and which automatically monitors data responses in real time and remotely notifies an attendant or other service personnel of a defined response or set of responses, facilitating immediate interaction with the survey respondent prior to their departure from the service establishment.

It would also be advantageous to provide a self-administered survey device which collects data on surveyed events and, in association with a predetermined or pro-programmed event, condition or set of conditions, response or set of responses, or threshold survey score or set of sub-scores, alerts a survey attendant or other service personnel of these particular responses in real time by transmitting, by means of a transceiver, stored data while the survey device is still in the possession of the respondent. Since this notification of restaurant personnel occurs in real time, and is not merely a download of survey information, it instantaneously conveys information to service personnel, such as, for example, a manager or station attendant, and serves as a trigger for immediate action or intervention by restaurant personnel to either rectify possible service failures or acknowledge service accomplishments.

It would also be advantageous to provide a survey device which triggers interactive and remote alteration of survey questions in real time, by means of a transceiver, based upon certain predetermined answers provided by the survey respondent.

It would also be advantageous to provide a system and method for carrying-out self-administered surveys with remote portable devices, wherein a plurality of self-administered survey devices store selected survey data which can be uploaded rapidly and efficiently to a centralized data processing unit by means of, for example, a transceiver. Further, it would be advantageous to provide a system and method for carrying-out interactive, self-administered surveys with remote portable devices, wherein a plurality of self-administered, interactive survey devices communicate in real time with a remote site and trigger immediate action and intervention by service personnel to alter customer satisfaction prior to the customers departure from the establishment.

There is, therefore, a need for an interactive, real time or near real time, customer survey device which is user-friendly, presents easily tailored questions, requires no additional materials (such as pen or pencil) for use, presents responses in an electronic format that is easily processed without intervening data entry steps, and provides a means for immediate action by service personnel to impact customer satisfaction. Its appearance should be eye-catching but not intrusive. This device is portable so that it can be presented to the customer while they are still seated at the table and therefore inclined to take the time to answer the survey. Operation of the device should be self-explanatory and should use familiar display and data entry methods. Further, the device is advantageously compatible with the low ambient light levels often encountered in restaurants. Ideally, it is presented simultaneously with the check so that its use is a part of the same transaction and not a separate interruption. This will increase the probability that the survey will be completed and not viewed as a nuisance.

SUMMARY OF THE INVENTION

It has now been discovered that the disadvantages of prior art survey devices and systems can be overcome with an interactive, electronic, customer satisfaction and survey system having a remote, realtime or near real time, signaling capability in response to stimuli or realized, preprogrammed thresholds. Such realtime signals or transmissions can remotely notify or alert customer service personnel, as well as remotely trigger the transfer of additional, targeted survey questions when a respondent's realtime survey responses satisfy a predetermined condition or set of conditions. The device's capacity for real time transmissions while the respondent is completing the survey permits immediate interaction with the respondent either by allowing service personnel to interact directly with the respondent or by remotely uploading additional, specifically tailored survey questions which will more particularly address the respondent's customer service experience, whether positive or negative.

The instant invention is broadly directed to an interactive, portable, hand-held, electronic survey and satisfaction questionnaire device having a remote, realtime, signaling capability in response to preprogrammed and realtime stimuli or thresholds adapted for use in the hospitality industry, and more particularly restaurants. In the broad aspect, the system of the present invention is a portable, self-administered, interactive, electronic survey device, having means for storing and displaying survey questions and answers, a programmable microprocessor, and a transceiver, such as for example, an RF communications link, for real time or near real time data transmission to a remote unit in response to preprogrammed or uploaded alert conditions or survey responses, and a support system for interaction with said device on a real time or near real time basis to allow intervention in a customer's service experience prior to that customer's departure from the service establishment.

In accordance with the instant invention, the survey device automatically monitors survey data responses and transmits data in real time or near real time to a remote unit, such as, for example, a pager, a computer, or other remote unit, in response to predetermined criteria or sets of criteria triggered by a set of particular survey responses.

In one embodiment, the criteria for triggering transmission of a message via transceiver means, such as an RF communications link, to a remote unit is a respondent's selection of a preprogrammed survey response or set of responses. In another embodiment, the criteria for triggering transmission of a message via a transceiver to a remote unit is a survey respondent's fulfillment of a preprogrammed survey condition or set of conditions. In a further embodiment, the criteria for triggering transmission of a message via a transceiver to a remote unit is a survey respondent's achievement of a threshold cumulative survey score or sub-set of scores.

In an alternative embodiment, the system automatically monitors survey data responses and remotely downloads via transceiver means, in real time, additional, targeted survey questions from a remote unit, such as a central computer, remote gathering data unit, or other remote unit, in response to predetermined criteria or sets of criteria triggered by particular survey responses. These remotely downloaded additional survey questions then become a part of the survey being completed by the survey respondent. In one embodiment, the criteria for triggering the download, via a transceiver means, of additional survey questions from a remote unit is a survey respondent's selection of a preprogrammed survey response or set of responses. In another embodiment, the criteria for triggering the download, via a transceiver means, of additional survey questions from a remote unit is a survey respondent's fulfillment of a preprogrammed survey condition or set of conditions. In a further embodiment, the criteria for triggering the download , via a transceiver means, of additional survey questions from a remote unit is a survey respondent's achievement of a threshold cumulative survey score or sub-set of scores.

In a further embodiment of the device, a direct communications link is provided to connect the device to a centrally located transceiver base station, capable of communicating with remote units such as a pager and a computer and remote units, such as a central computer or a remote data gathering unit. The transceiver base stations assists the device with communicating with remote units and remote sites when the device is for example, out of range.

The instant device presents a series of questions, or prompts, to the user and records the answers. The on-board storage is sufficiently large to allow the device to store all of the responses internally, thereby allowing the device to be used for several days, or perhaps weeks, depending on the number of customers. The display is backlit, allowing the device to be used in the low light level situations often encountered in restaurants. The device is small enough to be incorporated into the check book in which the check is presented to the customer, and it is sufficiently similar in appearance to a common calculator that it will be familiar to most restaurant customers. It is easily operated, with answers entered by means of a simple keyboard, and user-friendly. Customers can quickly complete the survey without additional pens, pencils, or paper and without the need to discover where to deposit the survey when exiting the restaurant.

In an alternative embodiment of the device, a direct communications link is provided to connect the device to a remote unit, such as a personal computer or a remote data gathering unit. In this embodiment, the communications link is, for example, a hard wire, infrared, an Internet connection, or the like. This allows transmission of large amounts of stored data faster than over the RF link. This link allows the stored responses to be transferred to the computer and new questions to be loaded into the device. In a further embodiment, the device can load personalization information, such as patrons names or account numbers. This information can then be used to tailor the device for the customer to whom it will be presented. In another embodiment, timers are used to automatically dim the display or shut off the device after it has been inactive for a predetermined period of time.

Other objects, features, and advantages of the present invention will become apparent to those skilled in the art from the following detailed description. It should be understood, however, that the detailed description and specific examples, while indicating preferred embodiments of the present invention, are given for purposes of illustration and not of limitation. Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more fully understood from the detailed description to follow, with reference being made to the accompanying drawings in which like reference numerals represent like parts throughout and in which.

DESCRIPTION OF PREFERRED EMBODIMENTS

The following discussion focuses on the preferred embodiment of the system of the instant invention which includes a hand-held survey device incorporated into a restaurant check book in which the check is presented to the customer. However, as will be recognized by those skilled in the art, the disclosed apparatus is applicable to a wide variety of situations in which the garnering of customer satisfaction information is desired, including its use in non-food service industry. The disclosed invention is described below with reference to the accompanying figures in which like reference numbers designate like parts.

Figure 3:
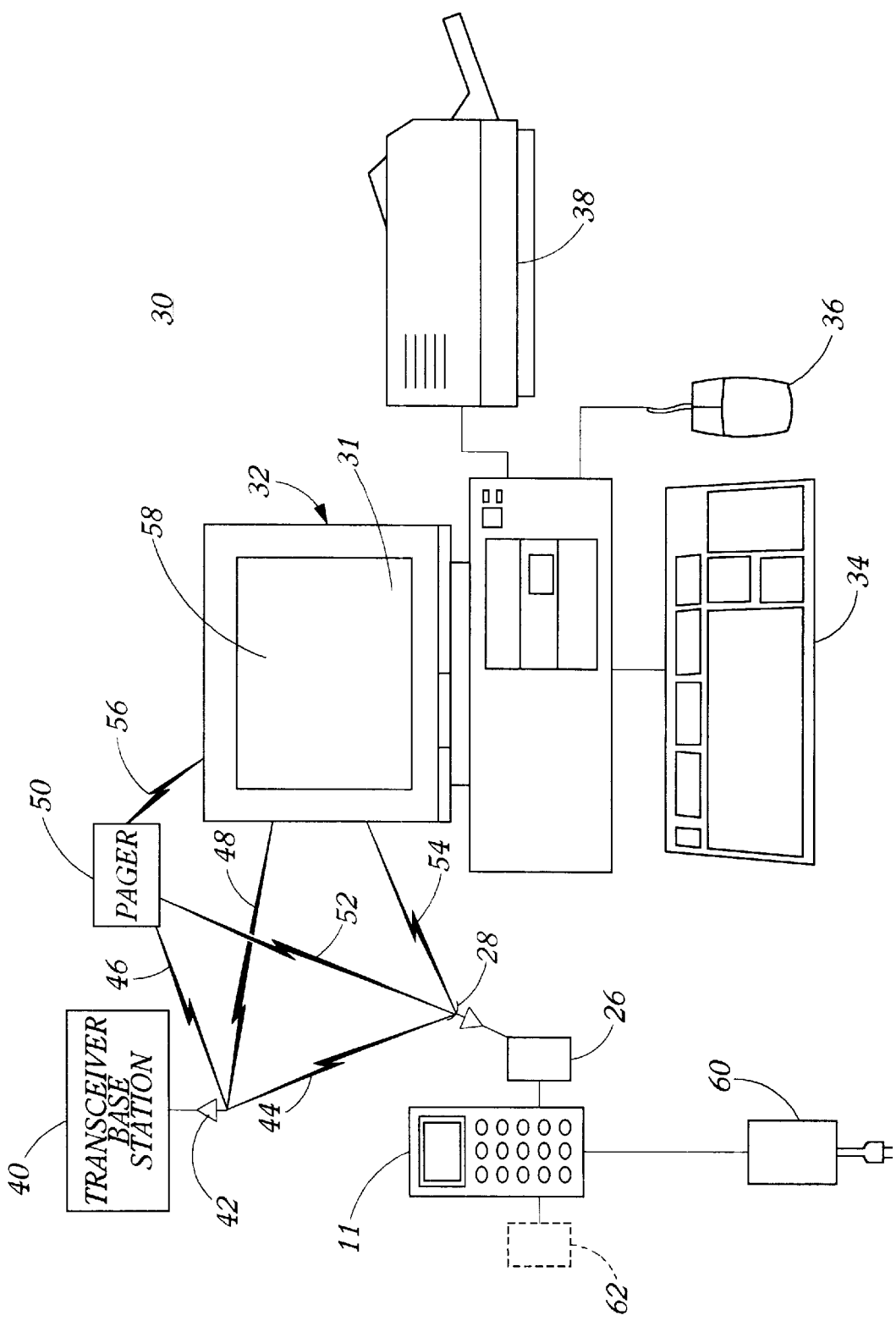
FIG. 3 provides a over view of the components of the system of the invention.

Turning first to FIG. 3 there is shown the survey system of the instant invention 30. A central computer or host 32, a handheld survey device 11, a pager 50, and a transceiver base station 40 comprise the preferred system of the instant invention. The handheld survey device 11 comprises the central component of the system 30 and communicates with the remainder of the components, preferably via RF, in real time or near real time during operation as will be further described below.

Figure 1:
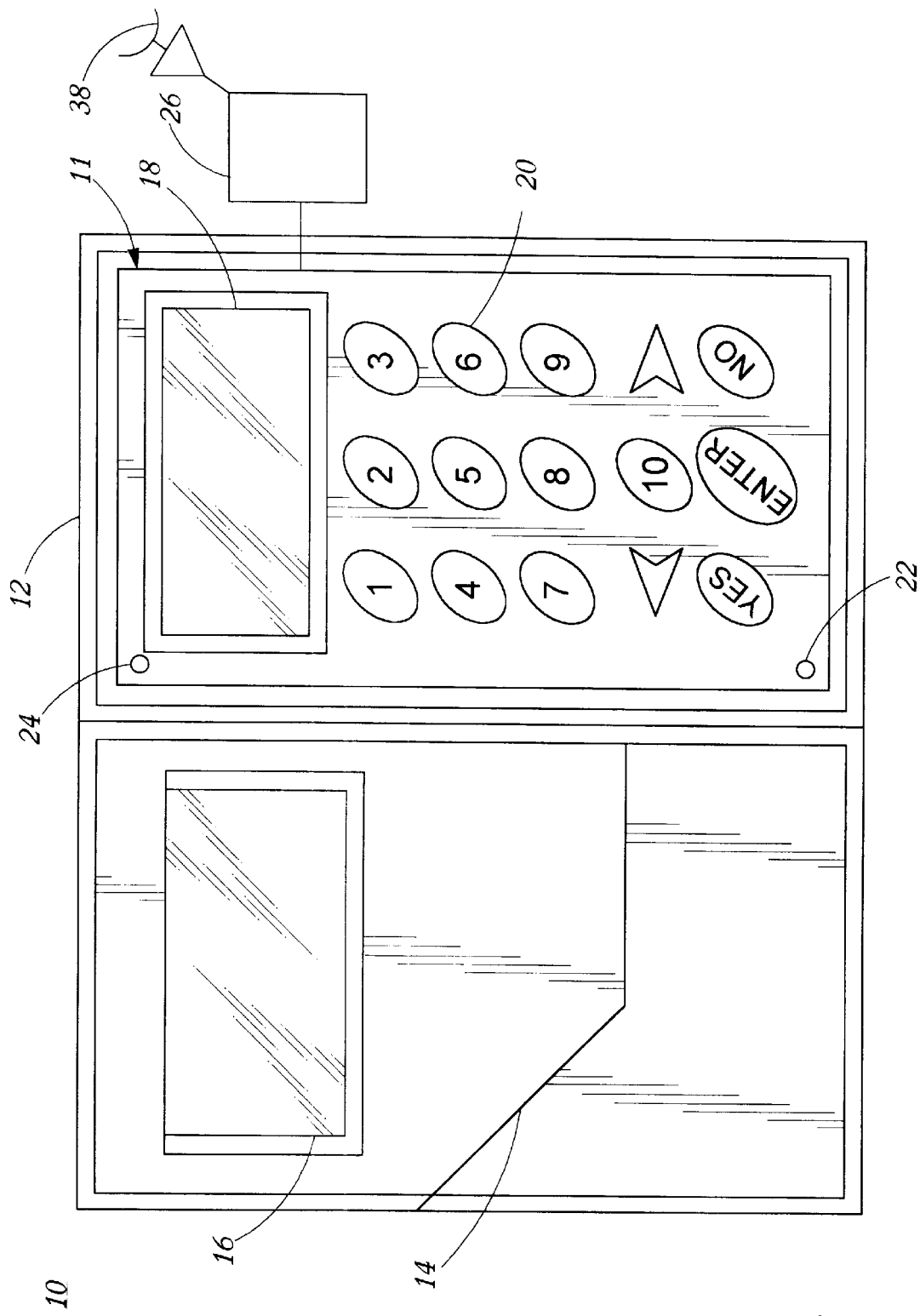
FIG. 1 presents an illustrative view of an electronic comment card device of the invention as it would appear when in use.

The main component of the system is the electronic comment card 10, as it would appear when in use by a customer, as better seen in FIG. 1. The survey device 11 is mounted in a "check book" 12. The check book is a term used in the hospitality business to describe the cover in which a restaurant check or bill is presented to a customer. The survey device 11 preferably occupies most, or all, of one side of the check book 12. The opposite side of the check book 12 contains a pocket 14 to hold a receipt and a pocket 16 to hold a credit card.

Turning specifically to the survey device 11, a display screen 18 presents alphanumeric information. Such displays are well known in the art, such as for example a liquid crystal display (LCD). Keypad 20 is of conventional design and used to input information to device 11 such as in response to questions appearing on display screen 18. Other features include a charging indicator 22, to provide a visual indication that the internal battery is being charged and a photo diode 24 which detects ambient light levels. The ambient light level controls the activation of back-lighting on the display. Display 18 is used to output information to the user. This may be questions, directions, or other messages. In the preferred embodiment, the display 18 uses back-lighting to enhance readability where there are low ambient light levels. Data from photo-diode 24 is used to determine when to activate the back-lighting for the display. When the cover of check book 12 is closed, the light is switched off to conserve power. As discussed below, alternative switching approaches are anticipated.

As will be further described, the device 11 communicates with the remainder of the system in real time or near real time to upload and down load data in response to certain criteria. As used herein upload indicates a transfer from the device 11 to the central or support computer 32, and download indicates a transfer from the central or support computer 32 to the device 11. Preferably, communication between the device 11 and the system is accomplished by transceiver 26 having antennae 28. The device 11 can communicate with pager 50, a computer 32, or a transceiver base station 40, as shown in FIG. 3.

In a preferred embodiment, the numeric keypad 20 is modified somewhat relative to a conventional calculator keypad. Use of the same basic layout provides a degree of familiarity to the user. The addition of the arrow keys, "Yes" and "No" and the use of the "10" key in place of the conventional "0" key provides an improved interface which is tailored to responding to, and navigating through, questions posed by the device. Many different configurations of keypads can be used without altering the functionality of the basic invention. These alternate configurations and layouts can be tailored to the type of questions being asked and/or to the particular survey audience.

Figure 2:
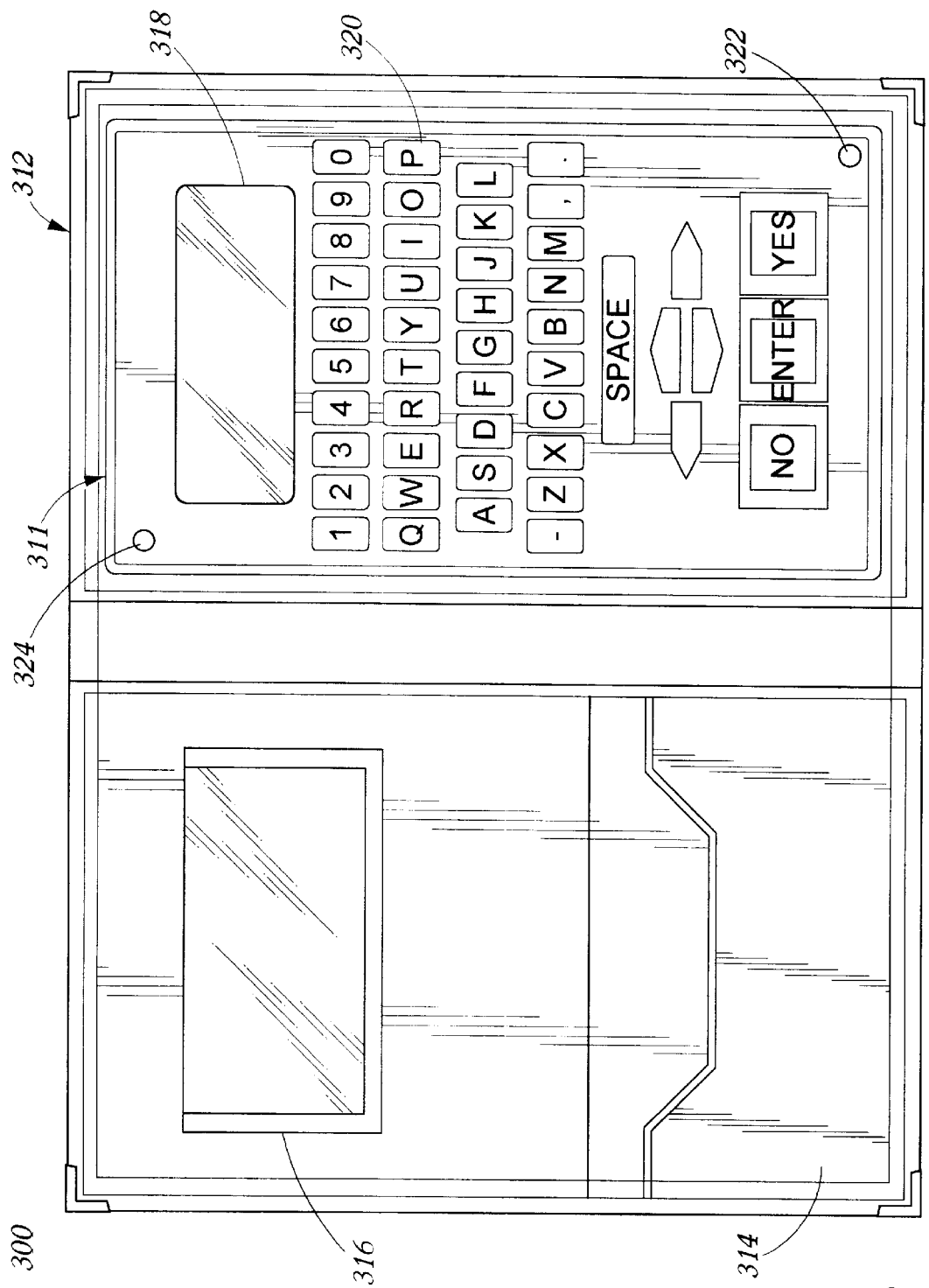
FIG. 2 presents an illustrative view of an alternate keypad layout for the electronic comment card device of the invention as it would appear when in use.

One such alternate embodiment is shown in FIG. 2. Turning to FIG. 2, there is shown electronic comment card 300 where device 311 has alphanumeric keypad 320. The use of keypad 320 permits the use of open-ended or "tracking" type questions, such as, for example, questions pertaining to a respondent's name, address, or any general or overall comments that a respondent may wish to note on the survey that may not have been otherwise addressed. The alphanumeric keypad 320 thus permits the gathering of descriptive or non-statistical information that cannot be input through a numeric keypad, such as keypad 20 shown in FIG. 1. The other aspects of the device shown in FIG. 2 are similar and similarly numbered to the device of FIG. 1. Touch-screen configurations for the devices 11 and 311 are also possible (not shown).

Figure 4:
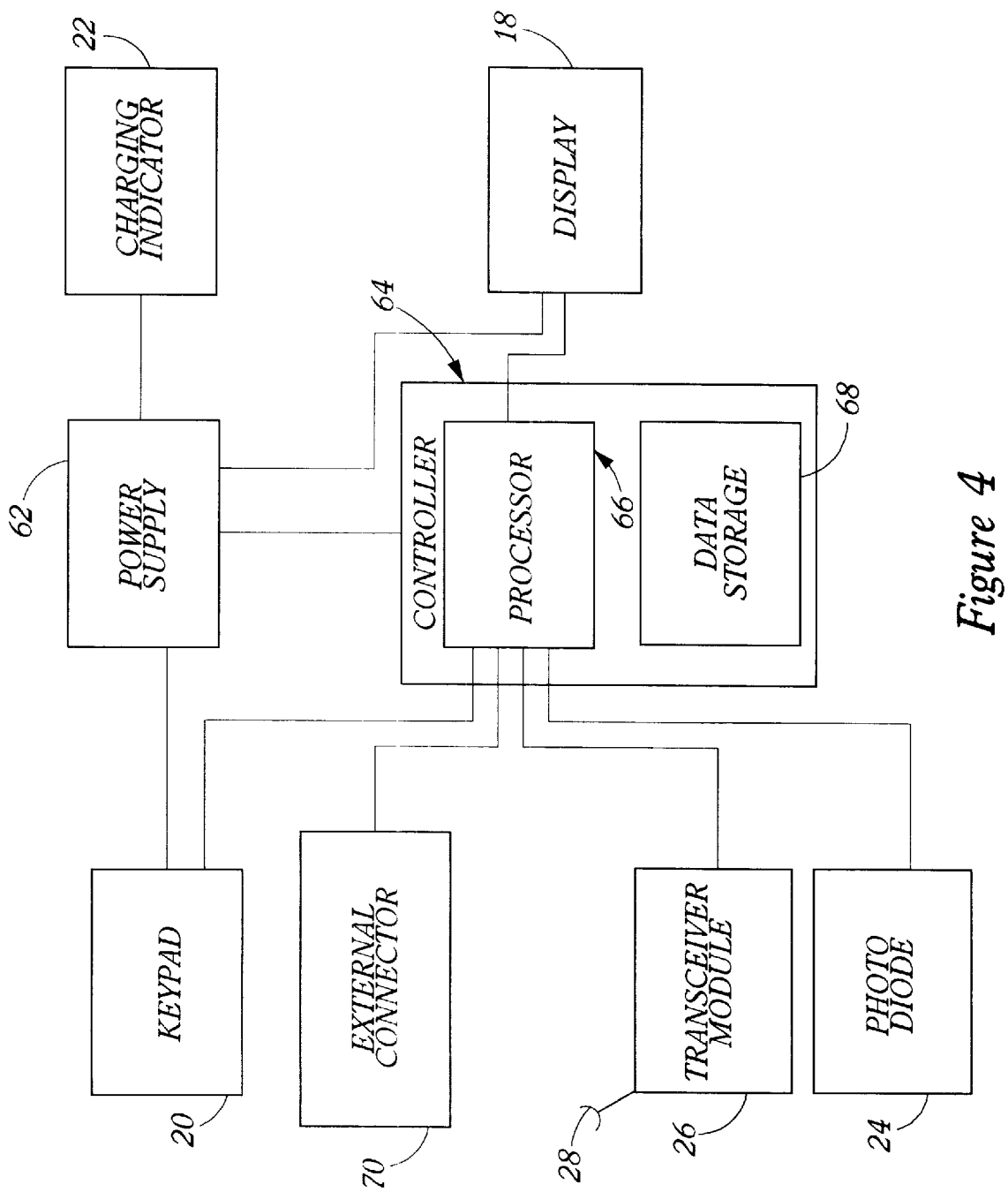
FIG. 4 is a block diagram of the major components of the device of the invention.

Turning to FIG. 4 there is shown a block diagram of the major components of the device 11. At the core of the device is the controller 64 which includes a microprocessor 66 and data storage 68. The storage includes both read only memory to hold the processors program and electrically erasable programmable read only memory ("EEP-ROM") which holds the survey questions and responses. The processor 66 executes its stored program and controls the remaining components, transferring data between them as needed.

In a preferred embodiment, the controller is a PIC16C74 from Microchip Technology, Inc. This is a CMOS, fully static, 8-bit micro-controller with integrated storage and peripherals. The processor is a Harvard architecture RISC with separate data and instruction buses. The instructions are 14-bit wide words, and the data are 8-bit wide bytes. Storage consists of 4K words of EPROM for the firmware program and 192 bytes of RAM for data storage. In addition, the controller includes 33 I/O pins; 3 timer/counters; 2 capture/compare/PWM module; and 1 serial port. Clearly, other controllers can be used.

In a preferred embodiment, transceiver module 26 is for communicating electronically with remote units, such as, for example, a transceiver base station 40, a pager 50, or a central computer 32 as shown in FIG. 3. Transceiver module 26 is mounted within the housing of the survey device 11 and is coupled to control circuits. Transceiver module 26 may provide, for example, a radio frequency (RF) type communications link via an internal or external antenna 28 on the survey device 11. Such transceivers are readily available commercially and are well-known in the art. The transceiver module located on the survey device 11 is capable of real time or near real time interactive communication with the system as shown in FIG. 3.

The customer responses, input from the user as individual key strokes, are read by the controller either to select options supported by the program or are stored as survey responses, as appropriate. External connector 70 provides a detachable coupling to the external communications link with the support computer 32 as well as provides a removable connection to an external power source 60 (FIG. 2). Charging indicator 22 (FIG. 1) provides a visual confirmation that power has been applied to the power supply 62, such as an on-board battery pack, from the external power source 60 and the internal charger (not shown).

The power supply 62 provides electrical power and is preferably rechargeable batteries. This enables independent, portable Use of the device for extended periods. Periodically, the device 11 will be connected to an external power supply 60 (FIG. 1) via external connector 70 to recharge the power supply 62, such as the batteries for example, through an internal charger (not shown). Alternatively, non-rechargeable batteries could be used.

Figure 5:
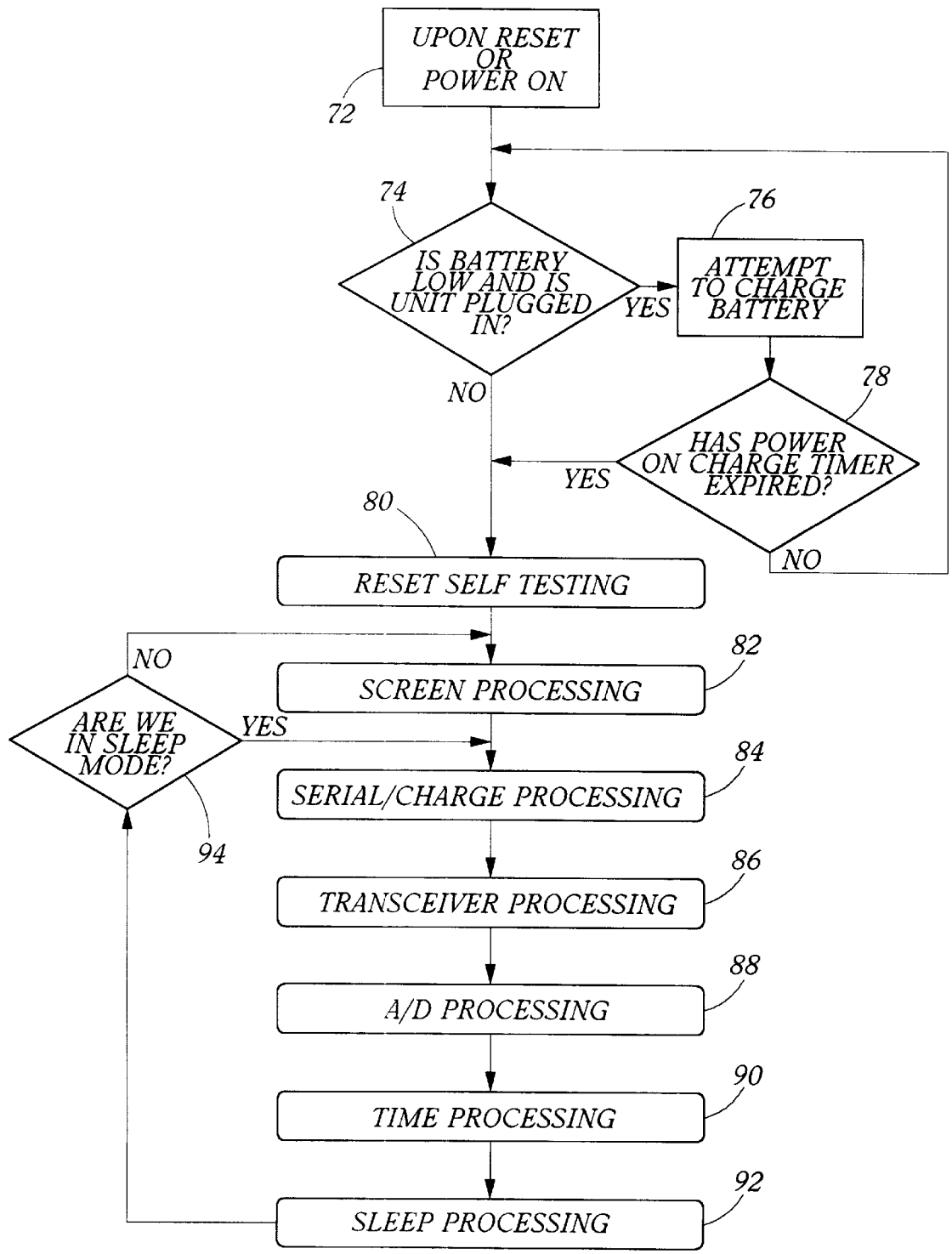
FIG. 5 is a flowchart of the main loop of the firmware incorporated in the device of the instant invention.

Referring now to FIG. 5, a flowchart illustrates the main loop of the device 11 firmware. The control program of the present invention comprises a main loop which is activated by either a reset or a power-on condition 72. Reset is triggered by several conditions, which include, but are not limited to, initial application of power to the circuit, restoration of power to the circuit, dips in the power supply voltage, and Electro-Static Discharge ("ESD") events. While the device is powered-on, it will continue to endlessly execute the main loop. The main loop comprises all of the unit's normal operational functions, and after each sub-task or process is completed, control of the device returns to the main loop.

When the device 11 resets, the control program, at 74, first determines the state of the battery's charge or whether the unit is plugged into an external power source and/or charger. If the battery is low and the unit is plugged-in, the control program attempts to charge the batteries at 76 until it is determined at 78 that either the battery is partially charged or the power-on charge timer has expired. This process is designed to prevent the device from resuming normal operation until the battery is capable of supplying enough power to do so.

After reset self testing is completed, the device checks to see if it is in sleep mode, that is that is, a low power state designed to prolong battery life during periods of inactivity. After reset self testing is completed, the control program completes any required screen processing 82. If the device is not in sleep mode, then it begins screen processing 82. When screen processing 82 is completed, the control program executes the following processes sequentially: serial/charge processing 84, transceiver processing 86, A/D processing 88, time processing 90, and sleep processing 92. If the device enters sleep mode, that is, a low power state designed to prolong battery life during periods of inactivity, the main loop screen processing 82 and initiates serial/charge processing 84. The control program executes the following processes sequentially: transceiver processing 86, AND processing 88, time processing 90, and sleep processing 92.

Figure 6:
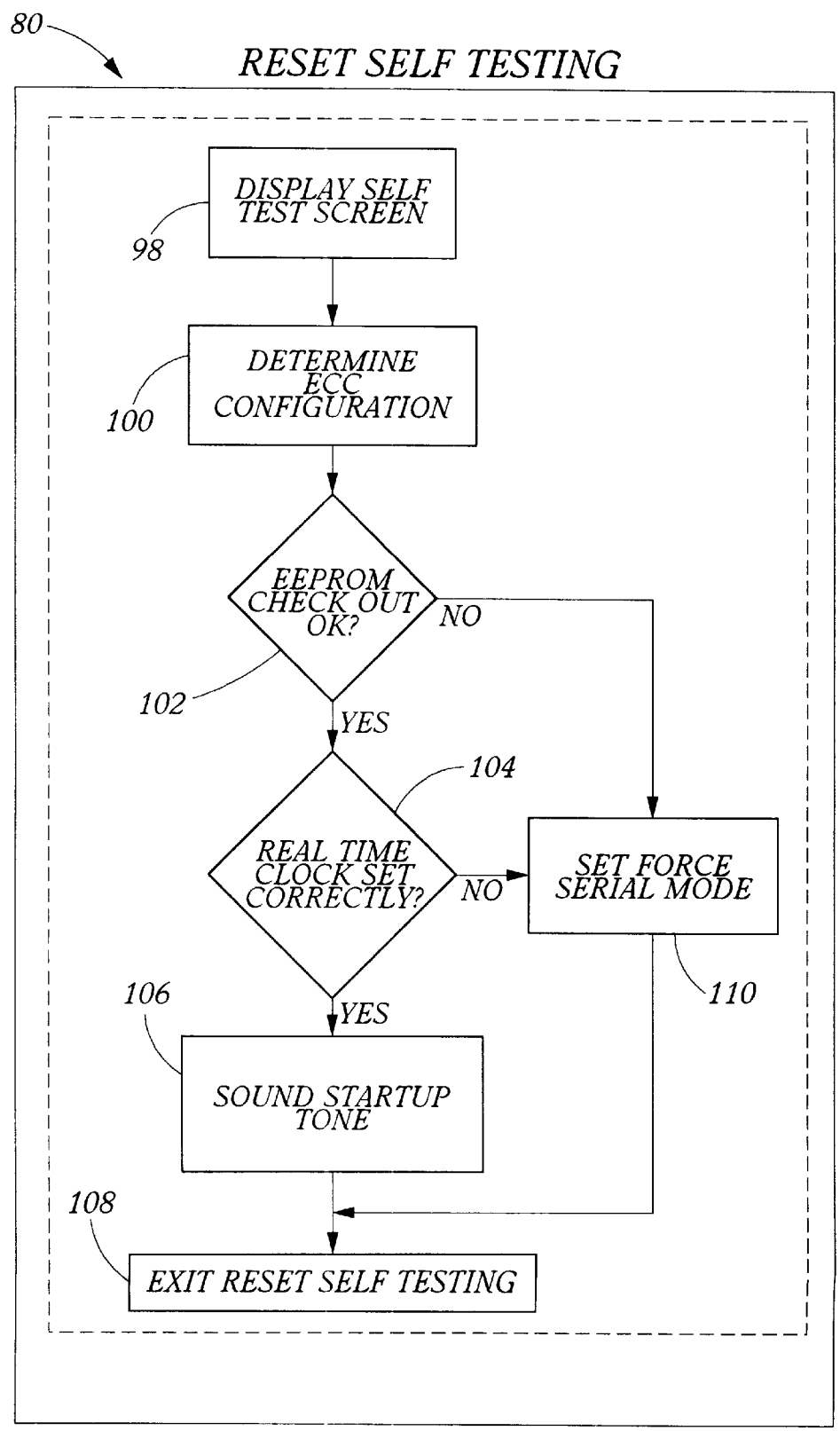
FIG. 6 is a flowchart of the firmware's reset self-testing process in the device of the instant invention.

Turning to FIG. 6 there is shown a detail of Reset Self-Testing loop 80 of the present invention. Reset Self-Testing loop 80 comprises displaying a self-test screen 98, determining the electronic comment card's ("ECC") configuration 100, and verifying the integrity of the EEPROM 102 (a form of non-volatile memory) and checking the Real Time Clock (RTC) to see if it is set correctly 104, sounding a startup tone 106, and then exiting reset self testing 108. If the EEPROM does not check out or the Real Time Clock is not set correctly, then the control program forces serial communications mode 110, which allows another device, such as, for example, a personal computer or a test fixture, to correct and/or report the failure. While Reset Self-Testing is performed, the control program displays a screen update of the process' current status on display screen 98.

During self-testing the ECC configuration 100 is tested by the control program to determine the amount of installed memory, the type of keypad being used, and whether a transceiver is present. During the EEPROM check 102, the control program determines the integrity of the EEPROM(s) and the data stored within it. The data stored in the EEPROM(s) comprises the unit's serial number; backlighting levels for various ambient light levels; backlighting and display inactivity timeout periods; fast charging start and stop parameters; service history; user defined lookup tables which can comprise, for example, employee names and personal identification numbers, customer names, answers to survey questions, and the like; and survey questions and responses. Upon exit of the self test phase at 108, the device enters Screen Processing 82.

Figure 7:
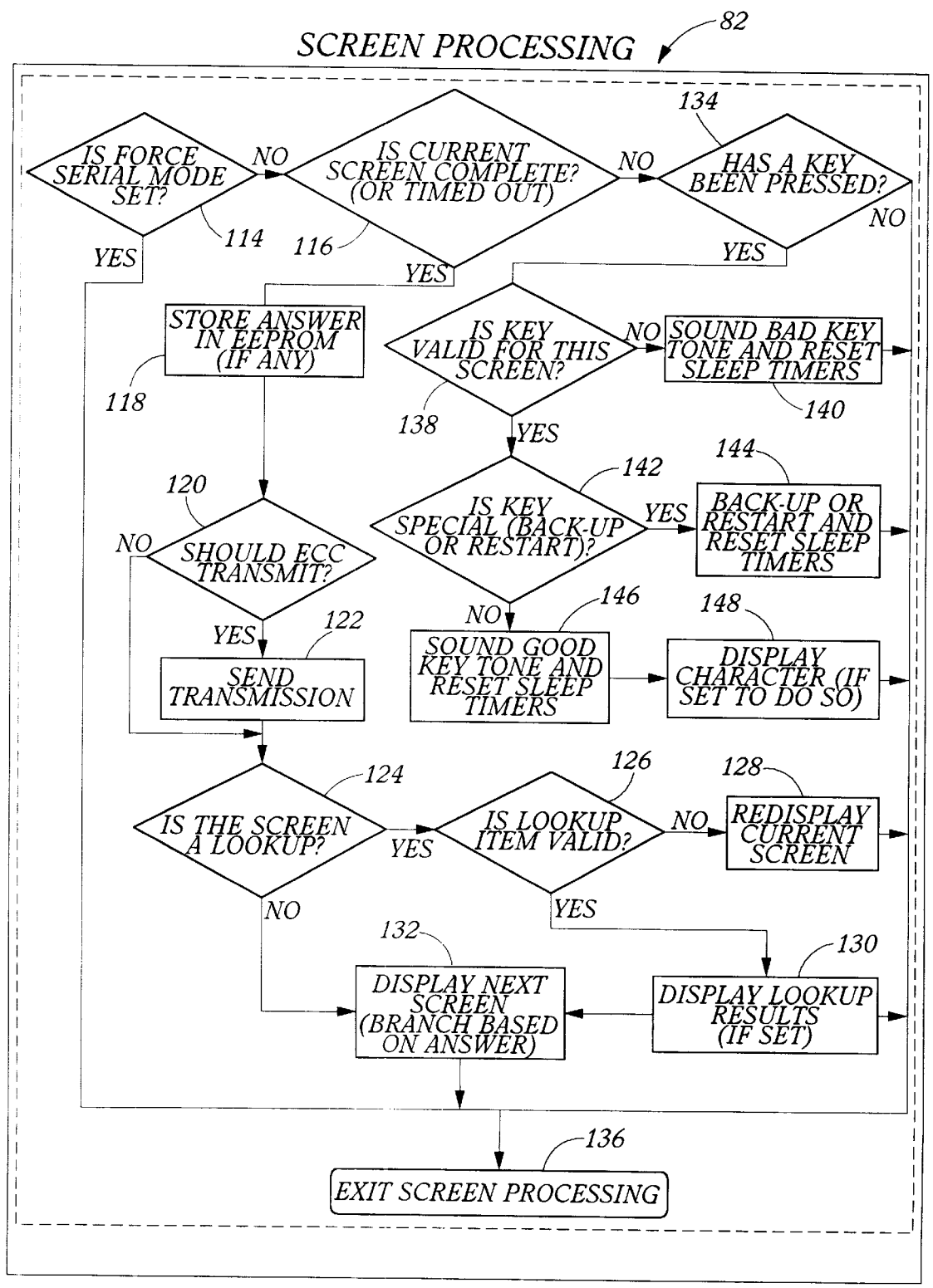
FIG. 7 is a flowchart of the firmware's screen processing in the device of the instant invention.

Turning to FIG. 7, a flowchart illustrates the Screen Processing phase 82 by the device of the instant invention. Screen processing 82 comprises displaying and/or updating the screen, checking for keystrokes, checking for screen completion, storing survey answers in EEPROM(s), transmitting (if set to do so and the conditions for transmission are met), displaying lookup screen results (if set to do so and data valid), and determining the next screen to display (based upon the survey answer). During the Screen Processing 82, the computer programs determines if force serial mode is set at 114. Force serial mode is a means for allowing the unit to display a message, such as, for example, "Waiting" or "Please Wait", when the unit waits for a communication from another device, such as, for example, a personal computer, that will direct the unit's next action, response, or request. If the force serial mode is set, the control program exits screen processing 82 at exit 136 immediately.

If the force serial mode is not set, screen processing 82 checks whether the current screen has been completed by the survey respondent or whether the screen has timed out at 116. If the screen has been completed, the answer(s) is stored in EEPROM at 118, and the device determines whether to transmit the answer(s) at 120. If an answer should be transmitted, the device sends the transmission at 122 to a remote unit. The device then determines whether the screen requires a lookup at 124. If a lookup is required, the device determines whether the lookup item is valid at 126. If the lookup item is invalid, the unit redisplays the current screen at 128 and exits screen processing at 136. If the lookup item is valid, the lookup results are displayed at 130, the device displays the next screen at 132, based on the last answer, and exits screen processing at 136.

If the current screen has not been completed, the device determines whether a keystroke has been made at 134. If no keystroke is present, the control program exits screen processing at 136. If a keystroke is present, the device checks whether the keystroke is valid for the active screen at 138. If the keystroke is invalid, the device sounds a bad key tone, both the display and back-light sleep timers are reset at 140, and the device exits screen processing at 136. If the keystroke is valid, the device determines whether the keystroke was special at 142, that is, whether it was a request to display the previous screen or a request to restart the questionnaire. If the keystroke was a special one, the device returns to the previous screen or restarts the questionnaire, resets the display and back-light sleep timers at 144, and then exits screen processing at 136. If the keystroke was not a special one, the device sounds a good key tone and resets the display and back-light sleep timers at 146. The device then displays an appropriate character, if set to do so at 148, and exits screen processing at 136. The screens and their associated parameters, such as branching conditions, transmission conditions, display pause time, valid keystrokes, lookup table, screen type, counter or special display information, etc., are read from the EEPROM.

Figure 8:
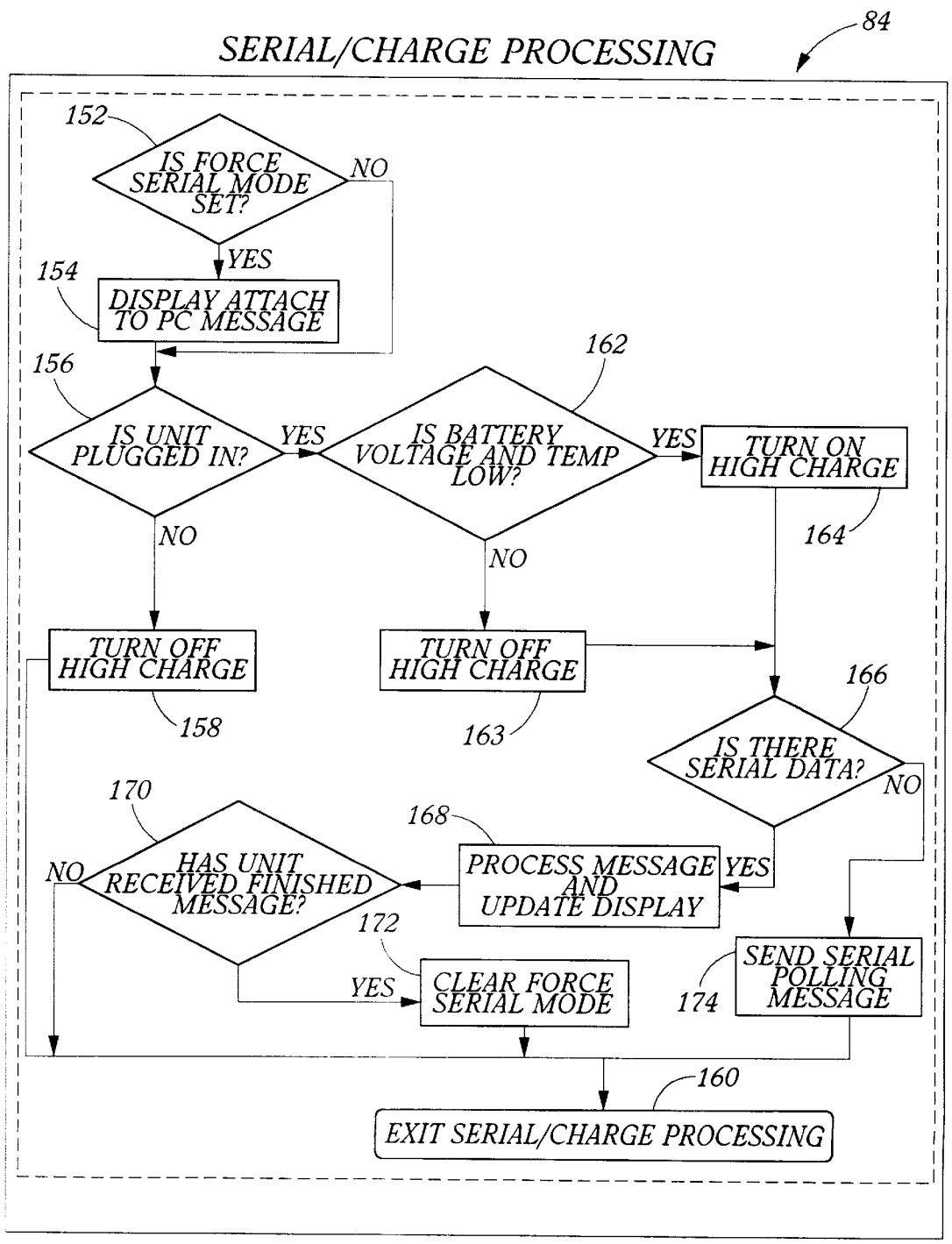
FIG. 8 is a flowchart of the firmware's serial/charge processing in the device of the instant invention.

Referring next to FIG. 8, a flowchart illustrates Serial/Charge Processing by the device of the present invention. Serial/Charge Processing 84 comprises charging the battery when the device is attached to a power source, checking for serial messages, and processing serial messages. During the Serial/Charge Processing 84 the computer programs determines if force serial mode is set at 152. If force serial mode is set, the unit displays an "attach to PC" message at 154, which is set when the device is out of EEPROM storage or otherwise not operating correctly. The device then determines whether it is attached to a personal computer ("PC") at 156. If the device is not plugged into a personal computer, the control program turns off high charge at 158 and exits serial/charge processing at 160. If the device is plugged into a personal computer, the device then determines whether the battery voltage and temperature are low at 162. If the battery voltage and temperature are not low, high charge is deactivated at 163, and the control program checks whether a valid serial message is received at 166. If the battery voltage and temperature are low, that is, voltage and temperature are within the range values read from EEPROM, high charge is activated at 164, and the control program checks whether a valid serial message is received at 166. If a valid serial message is received, the control program processes the valid serial messages and updates the display at 168. These messages comprise read EEPROM data, write EEPROM data, read battery state, read firmware revision, set the real time clock ("RTC"), set force communication mode, and download complete. The device acknowledges or refuses (i.e., Negative AcKnowledges ("NAK")) the serial message at 168, so that the computer or other device is informed of the success or failure of the message and responds accordingly. The control program updates the display 18 (FIG. 3) to indicate the processing of serial messages and/or indicate the unit's status. The download complete message informs the device when the host device has completed communications and the data contained within the EEPROM is ready for processing at 170. This message also ends the force serial communication mode at 172, and the control program exits serial/charge processing at 160. If there is no valid serial message, the control program sends a serial polling message at 174 and then exits serial/charge processing at 160.

Figure 9:
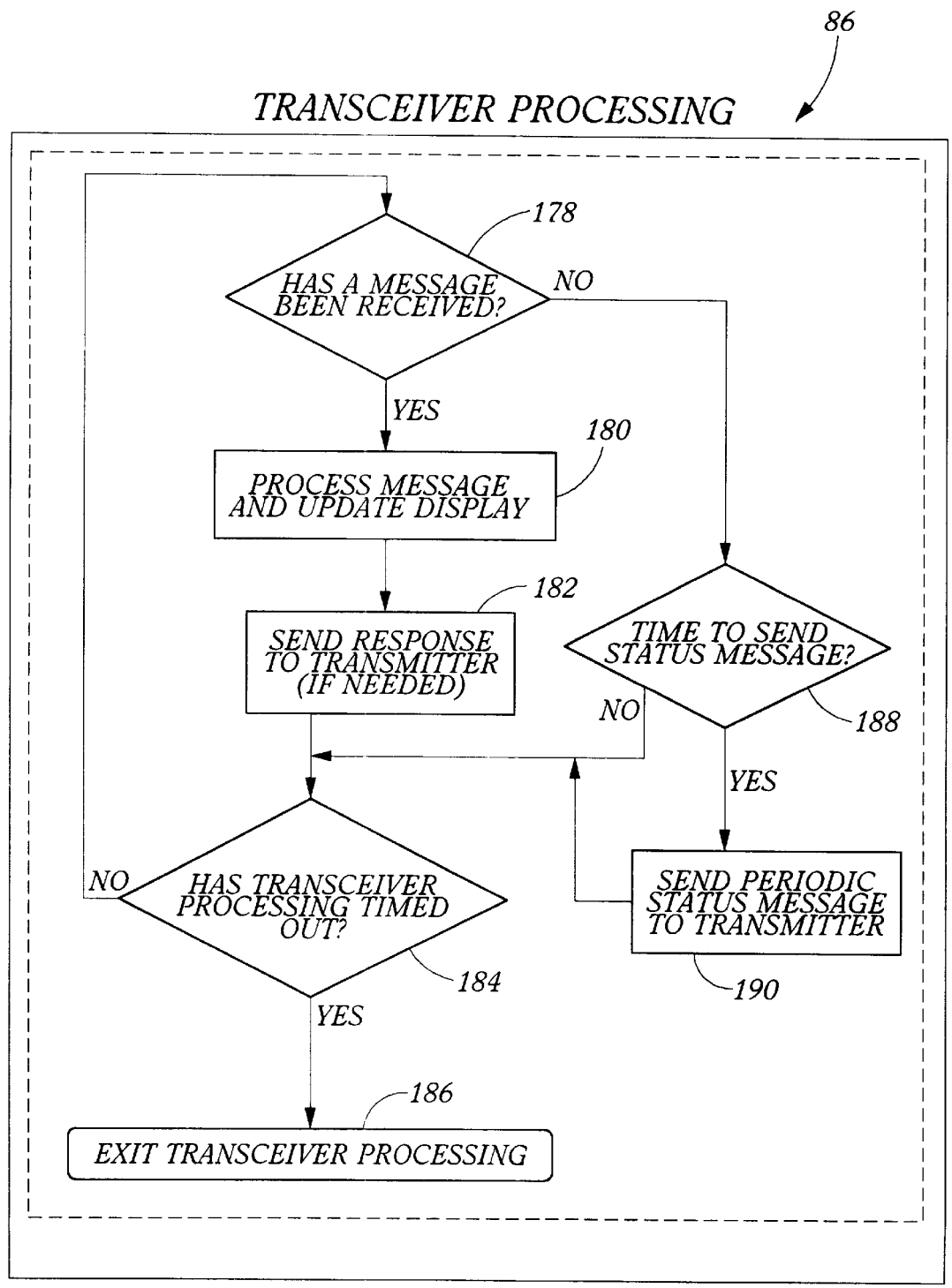
FIG. 9 is a flowchart of the firmware's transceiver processing in the device of the instant invention.

Turning next to FIG. 9, a flowchart illustrates Transceiver Processing by the device of the instant invention. Transceiver processing 86 comprises sending periodic status messages, checking for received messages, and processing those messages. These messages comprise read EEPROM data, write EEPROM data, read battery state, read firmware revision, set the RTC, set/reset transceiver timeout, write to the display, read keypad, force communication mode, and transmission complete. The device acknowledges or NAKs the messages, so that the computer or other unit is informed of the success or failure of the message and responds accordingly. The device updates the display 18 (FIG. 3) to indicate the processing of messages and/or the device's status. The transmission complete message informs the device when the computer 32 has completed communications and when to continue operation, which results in an immediate timeout.

Transceiver processing 86 begins by querying whether a message has been received at 178. If a message has been received, the control program processes the message and updates the display at 180, and then sends the response to the transmitter (if necessary) at 182. The program then queries whether transceiver processing has timed out at 184. If transceiver processing has timed out, the program exits transceiver processing at 186. If transceiver processing has not timed out, the program loops back to the beginning of the process. If a message has not been received, the program queries whether it is time to send a status message at 188. If it is time to send a status message, the program sends a periodic status message to the transmitter 26 at 190, and the programs continues by querying whether transceiver processing has timed out at 184. If the transceiver processing has timed out then the computer program exits the transceiver processing 186.

Figure 10:
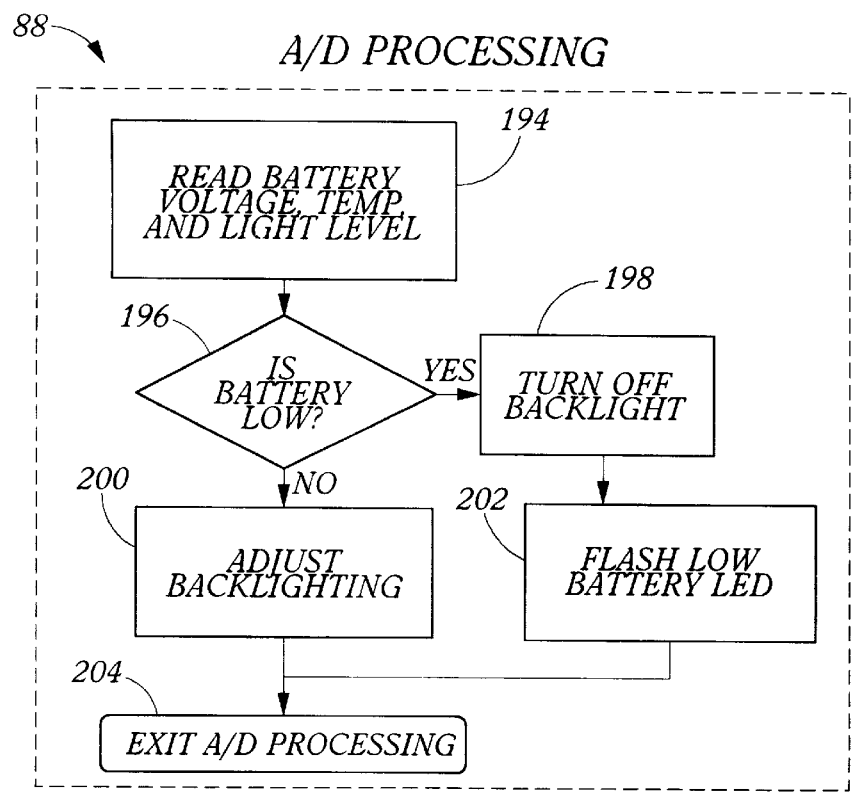
FIG. 10 is a flowchart of the firmware's A/D processing in the device of the instant invention

Referring next to FIG. 10, a flow chart details the analog to digital conversion ("A/D") processing 88. A/D processing 88 begins by reading and converting certain external analog signals, such as, for example, the battery voltage, temperature, and ambient light level at 194. It then queries whether the battery is low at 196. If the battery is low, the computer program turns off the back light at 198, flashes the low battery indicator when necessary at 202; and exits A/D processing at 204. If the battery is not low, the back light level is adjusted at 200 and A/D processing at 204 is exited. The backlighting level for the appropriate ambient light level is read from EEPROM. Over a pre-set period of time so as not to disconcert the user, the backlighting level is adjusted to the value read from EEPROM.

Figure 11:
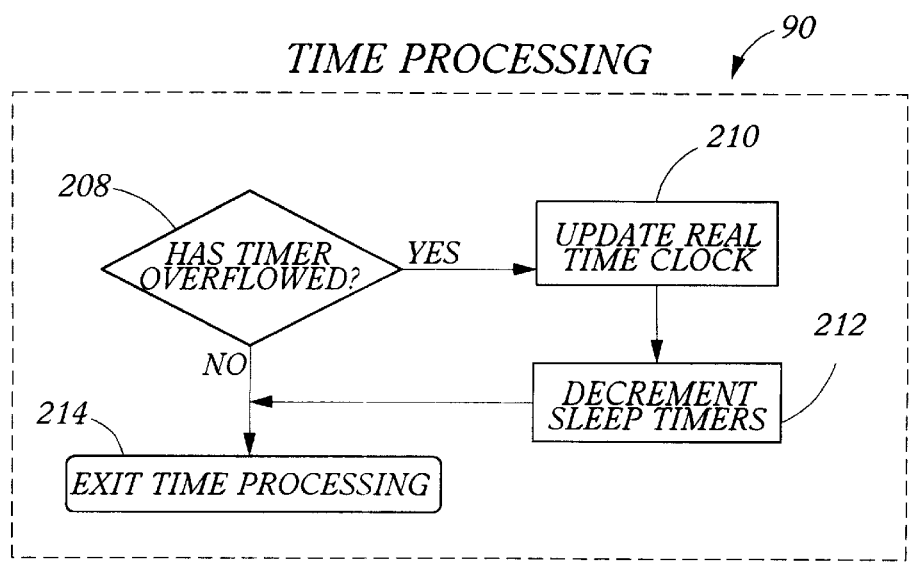
FIG. 11 is a flowchart of the firmware's time processing in the device of the instant invention.

FIG. 11 illustrates, in detail, the Time Processing 90. Time processing 90 begins by querying whether the timer has overflowed at 208. If the timer has overflowed, the real time clock is updated at 210 and various timers, such as, for example, the backlight and display sleep timers at 212 are decremented. Time processing is then exited at 214.

Figure 12:
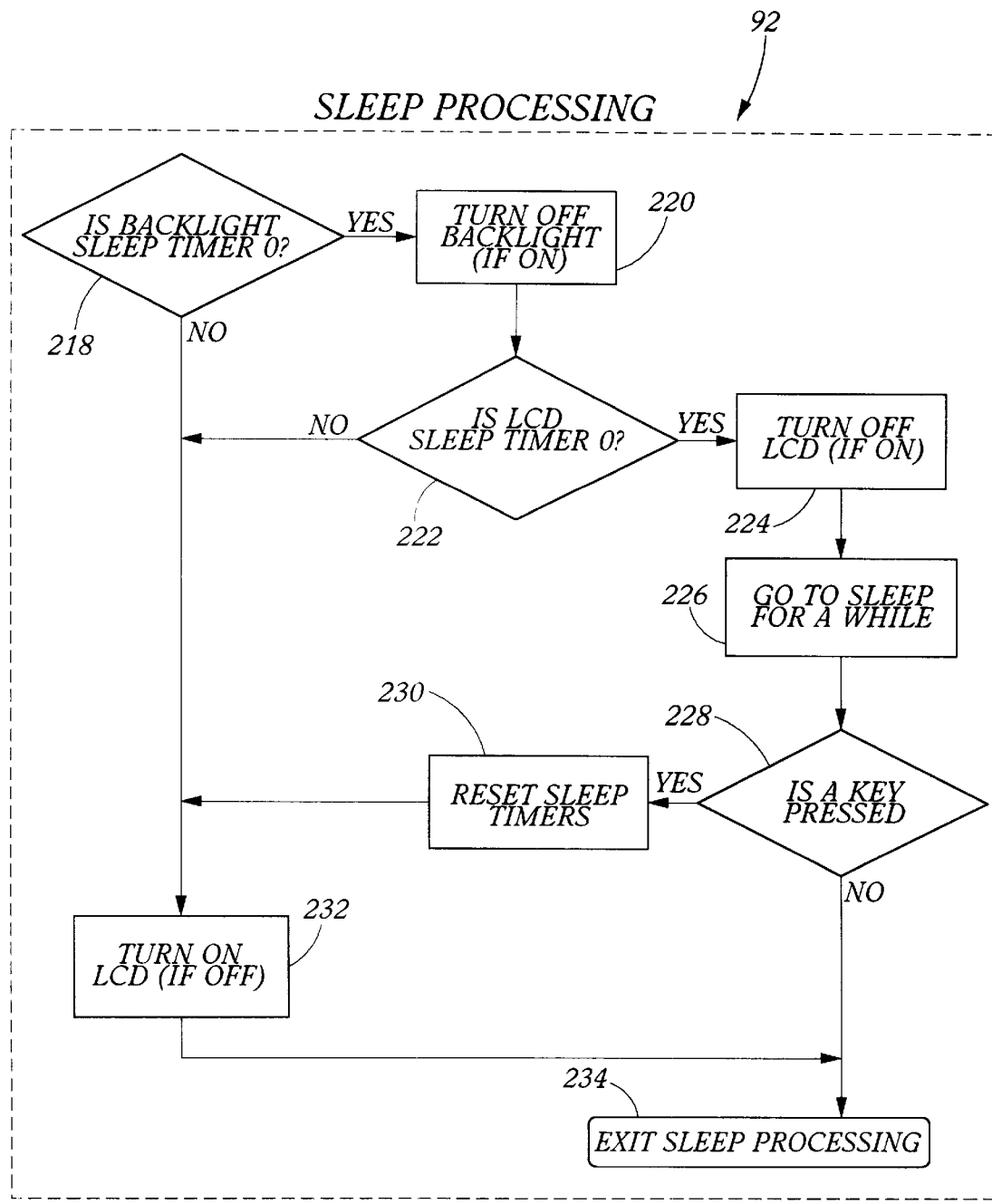
FIG. 12 is a flowchart of the firmware's sleep processing in the device of the instant invention.

FIG. 12, illustrates, in detail, Sleep Processing 92. This is an idle mode in which the device is active but power saving measures are in effect. Entry into this mode interrupts power to both the display and to the backlight for the display. The controller then enters Sleep processing 92. Periodically, the controller reactivates to check for data entry on the keypad or opening the device's cover. If either of these events has occurred, the display and backlight are re-activated, timers are reset, and the device returns to the Mode from which it entered Sleep processing. If neither event has occurred, the controller resumes sleep mode.

Sleep processing 92 begins by checking the state of the backlight sleep timers at 218. If the backlight sleep timer is "0", the backlight is powered down at 220, and the program queries whether the LCD sleep timer is "0" at 222. If LCD sleep timer is "0", the LCD is turned off at 224, the device enters low power or sleep mode at 226, and the program queries whether a key has been pressed at 228. If a keystroke or similar activity is detected, the program resets the sleep timers at 230, turns on the LCD (if necessary) at 232, and exits sleep processing at 234. If no keystroke has been detected, the program exits sleep processing at 234. If the backlight sleep timer initially is not "0", then the LCD is turned on (if necessary) at 232, and the device exits sleep processing. Various devices, such as, for example, the LCD, the backlight, and the transceiver, can be powered down independently, depending upon the state of their respective sleep timers. When all sleep timers have expired, the processor enters sleep mode to minimize power usage. The processor reactivates when the RTC timer overflows, which occurs approximately every 2 seconds, and checks for activity, such as, for example, serial data, transceiver data, and keystrokes. When activity is detected, the sleep timers are set from default values stored in EEPROM, and any actions necessary to restore the unit's operational state are initiated.

Turning to FIG. 3 there is shown the operation of the system 30 with the device 11 in interaction with a central computer or supporting host computer 32. Computer 32 can be almost any size of computer, from a notebook to a mainframe. However, the use of a conventional desktop personal computer is preferred. The computer 32 is used to compose a set of survey questions to be downloaded to the survey device 11, to store and analyze survey results uploaded from the survey device 11, and to print reports summarizing the survey results. A typical computer 32 configuration would include the computer monitor 58, keyboard 34, mouse (or other pointing device) 36, and a printer 38. Other configurations are possible, and the exact configuration is not critical to the invention. Residing on the computer 32 will be a custom communications program for transferring data to and from the survey device and variety of commercial, off-the-shelf programs for analyzing and formatting the data. It should be noted that, typically, a single computer 32 would be used to support several survey devices. A restaurant, for example, may have a single support computer 32 and dozens or hundreds of survey devices 11.

In a preferred embodiment, transceiver 26, housed within or located on survey device 11, transmits, when activated internally by a predetermined survey response registered by the survey device 11, an electronic message to a remote unit such as, pager 50 via communications link 52 or central computer 32 via communications link 54, to alert restaurant personnel in real time of either adverse or positive customer feedback. Communications link 52 and 54 are preferably a radio frequency (RF) link or other wireless communications link well known and practiced by those skilled in the relevant art.

In an alternative embodiment, computer 32 can relay the electronic message received via communications link 54 from transceiver 26 on survey device 11 to pager 50 via communications link 56 to alert restaurant personnel in real time or near real time of either adverse or positive customer feedback. Communications link 56 is an RF communications link or other wireless communications link well known to those skilled in the art.

In an alternative embodiment, the communications link 54 electronically connects the transceiver 26 located on survey device 11 to computer 32 to upload data stored in the survey device 11 to computer 32. Communications link 54 can electronically connect transceiver 26 to computer 32 when transceiver 26 is activated, either internally by a survey response registered by survey device 11 or externally by a signal from computer 32, to transmit or receive a signal to download from computer 32 new survey questions.

The communications link 54 can electronically connect the survey device 11 to the computer 32 while results are being uploaded or questions downloaded. This link may be implemented by several different mechanisms including a hard link, such as an optical fiber link; a wireless radio frequency link (either intermittent or continuous); or a wireless optical link (typically infrared). In another embodiment, a serial cable with a connector at either end will be used to provide the communications link.

A transceiver base station 40 having antennae 42 can be used as a relay when transceiver 26 located on device 11 is out range of for example, pager 50 or computer 32. Transceiver communications link 44 is preferably a radio frequency (RF) communications link or other wireless communications link well known and practiced by those skilled in the relevant art. The transceiver base station 40 then can transmit an electronic message to pager 50 via base station communications link 46 and/or central computer via base station communications link 48, to alert restaurant personnel in real time of either adverse or positive customer feedback. Base station communications link 46, is preferably an RF communications link or other wireless communications link well known to those skilled in the art. In one preferred embodiment, base station communications link 48, which electronically connects transceiver base station 40 with computer 32, is a serial, USR, infrared, or other link well know to those skilled in the art. In another embodiment, base station communications link 48 is an RF communications link or other wireless communications link well known to those skilled in the art.

In an alternative embodiment, the transceiver communications link 44 electronically connects the transceiver 26 located on survey device 11 to the transceiver base station 40 to upload data stored in the survey device 11 to a central computer 32 through base station communications link 48. In another aspect, communications link 44 electronically connects transceiver 26 to the transceiver base station 40 when transceiver 26 is activated to transmit or receive a signal to download from transceiver base station 40 new survey questions that transceiver base station 40 downloaded from computer 32 through base station communications link 48.

Transceiver 26 is activated in one of two ways. First, transceiver 26 can be activated internally by a survey response registered by survey device 11. Second, transceiver 26 can be activated externally by a signal from computer 32 transmitted via communications link 48 through transceiver base station 40 and communications link 44, or via any of the other links through which transceiver 26 communicates. Several survey devices 11 may interact simultaneously with a single, centrally located transceiver base station 40, pagers 50, or computer 32. The transceiver base station 40 is a typical commercial station capable of operating in a multiplex mode which permits several survey devices 11 to simultaneously exchange data responses via transceiver 26 with the transceiver base station 40. The transceiver base station 40 may be wall-mounted or fixedly attached in any convenient location and may be communicatively coupled through a cable to the central computer 32 which may be located in an office location remote from the transceiver base station 40.

Power source 60 can be used to periodically recharge the device's on-board power I g supply 62 by means of a charger (not shown) that is internal to the device 11. The onboard power supply 62 can be, for example, batteries or a battery pack. If desired, a "docking station" comprising a physical cradle, a connector for the communications link, and a connector for the charger may be used. Such docking stations for portable computers are well known.

While the preferred embodiment of the invention has been disclosed above, several alternative embodiments are possible for various aspects of the invention. First among these is that the device may be used independently of the check book cover. Especially in non-restaurant applications, the survey device may be configured as a separate device similar in configuration to a calculator.

The following scenario illustrates the use of the inventive system. As a meal at a restaurant draws to a close, the server confirms that there is nothing more that the diners need and then prepares the check. The server then presents the diners with a hinged check book of conventional appearance and requests that they complete the electronic survey questionnaire. When the check book cover is opened, diners find that one side holds their check and the other contains an electronic device, similar in size and appearance to a calculator, including a keypad and multi-line display screen. As the cover opens, the screen illuminates and a greeting message is displayed asking if they would answer a few questions. Pressing the "Yes" key to agree, they are presented with a series of simple questions asking about specific aspects of their dining experience. These may be simple Yes/No questions such as "Were you satisfied with the number of selections offered?", ranking questions such as "On a scale of 1–10, how would you rate the speed of service?", or more general questions, such as "How many times have you visited our restaurant?". Using a conventional 10-key keypad, supplemented with "Yes" and "No" keys and an "Enter key, the diners answer each question. After the last question, a message is displayed thanking them for their time, and the answers are stored. Signing the check, they place it in the check book and close it. The check book is later collected by the server.

In the event that the diner selects certain responses or sets of responses which meet preprogrammed thresholds of any indicia of interest to management, such as, for example, satisfaction/dissatisfaction with the service provided, the device's transceiver signals a pager, a computer. If the device is unable to communicate with the pager, computer or central computer because for example, it is out of range, the device may signal, via a communications link, a centrally located transceiver base station. The transceiver base station is then able to signal a pager, computer or central computer. Depending on the preprogrammed trigger criteria met by the respondent, the transceiver may also signal a central computer to download, via a communications link additional, specifically targeted survey questions to the survey device while the respondent is completing the survey. Alternatively, the transceiver may transmit a signal to a pager and/or a computer monitored by service personnel to identify the respondent's table number as well as the specific threshold trigger that initiated the transmission. A manager or other customer service personnel would then interact directly with the survey respondent and attempt to rectify any service failures or reinforce service accomplishments before the respondent had the opportunity to leave the service establishment. In this manner, customer service personnel have the ability to exercise possible "damage control" in the case of service failures, thereby mitigating or eliminating potential negative word of mouth advertising. Management also has the opportunity to reinforce and/or supplement any positive service experiences, thereby providing further impetus for positive word of mouth advertising.

The above sequence is repeated many times over a period of several days, during which time several different servers present the same check book and survey device to many different diners. At the same time, other check books and survey devices are presented to other diners. Afterward, the check books can be collected by a manager, or head waiter, and taken to the office. They can then be connected to a personal computer via a simple cable which plugs into a socket in the survey device. A software program on the computer communicates with the survey device and uploads the survey responses into a database on the computer. At the same time, a new set of questions, prepared ahead of time, may be downloaded into the survey device. The device is then disconnected and plugged into a recharger. After charging, the check books are returned to the server's station for continued use.

Within the computer, the survey results are immediately available for review by the manager. Statistical or analysis packages may be used to process the survey data, providing a picture of customer satisfaction and opinions over the previous several days. The results for each server can be analyzed to highlight individual performance. The most recent data may also be combined with previously uploaded data to provide a longer term picture and to help identify trends. This analysis can help identify both problem areas and successes in the eyes of the customers. Based on the responses, the manager may develop a new set of questions to gather more detailed information or to ask about a different area. These will be downloaded to the survey devices when they are next linked to the computer.

The device of the instant invention provides improved customer convenience, and therefore increased customer willingness, in giving candid and timely customer service information. The proprietary software employed by the device can tabulate this information and thereby establish performance ratings for a particular employee, for a particular establishment, or even across a plurality of establishments. In accordance with the invention, the device increases the amount of information available for analyses over prior art methods and devices. The data collected by the device can be manipulated in a manner which establishes performance criteria and can measure the performance of particular employees and/or particular establishments within a given region or territory against the established criteria or standard. Additionally, the device can archive the collected data and formulate historical criteria to facilitate improved management of the establishment or plurality of establishments which is/are utilizing the device. Further, the archived historical criteria can provide incentive criteria for particular departments, employees, or establishments.

Several alternatives to this basic scenario are readily apparent. The first is that the survey device may be presented to the diners separately from the check. This may be either at the same time, but separate, or at a different time. It may also be desirable to input information to the device, prior to providing it to the diners, to identify the particular transaction. This information might include a server ID, a table number, a customer number (or member number for a private club), or a transaction identifier.

Personalization of the survey may also be included. By supplying the device with the customers name, the greeting screen and thank you screen could incorporate that name. The name could be obtained from the personal knowledge of the server, the records of a private club, or perhaps from a credit card used by the diner (when the survey device is present after the charge slip has been processed).

Alternative key formats are also clearly possible. By using keys which are adjacent to specific areas of the screen a more intuitive interface can be provided. A series of keys corresponding to ranking criteria, such as 1–5 or A–D, could be provided, arranged in a single row, to simplify the answering of ranking questions. Specific alternative keypads are discussed below.

Other scenarios can be easily developed which demonstrate the use of the device in other service industries and even in non-service businesses. The compactness, portability, and flexibility of the device enable its use in a wide variety of survey and polling situations.

Although the present invention has been described with reference to preferred embodiments, including particular materials and size parameters, those skilled in the art will recognize that various modifications and variations to the same can be accomplished without departing from the spirit and scope of the present invention and that such modifications are clearly contemplated herein. No limitation with respect to the specific embodiments disclosed herein is intended nor should any be inferred.

What is claimed is:

1. An electronic survey device having an alphanumeric display, an input keypad, a non-volatile data storage, a microprocessor, a self-contained power supply, a communications link, and a control program executing on said microprocessor;

wherein said control program executing on said microprocessor includes a pre-determined set of criteria which triggers a transfer of at least one pre-determined data message from said survey device to at least one remote unit upon the happening of the triggering event via said communications link, and said predetermined set of criteria comprises a preprogrammed condition or set of conditions to be satisfied by a survey respondent and a preprogrammed threshold cumulative survey score or sub-set of scores to be achieved by a survey respondent.

2. The electronic survey device of claim 1 wherein the remote unit comprises at least one pager or at least one personal computer.

3. The electronic survey device of claim 1 wherein said transfer of at least one predetermined data message is accomplished in real time or near real time.

4. The electronic survey device of claim 1 wherein the message transferred includes a signal beep on a pager to alert a person that a survey respondent has satisfied said predetermined set of criteria a text message on a pager to alert a person that a survey respondent has satisfied a particular component of said predetermined set of criteria, or a text message on a computer to alert a person that a survey respondent has satisfied a particular component of said predetermined set of criteria.

5. The electronic survey device of claim 1 wherein said control program executing on said microprocessor includes a predetermined set of criteria which triggers a near real time upload of survey responses via a transceiver.

6. The electronic survey device of claim 1 wherein said control program executing on said microprocessor includes a pre-determined set of criteria which triggers a real time upload of survey responses and a near-real time download of additional, targeted survey questions via a transceiver.

7. The electronic survey device of claim 1 wherein said communications link includes a transceiver.

8. A method of surveying a service establishment customer in near real time comprising the steps of:
  (a) programming an electronic survey device, having a communication link and a preprogrammed customer survey questions, with a set of criteria for triggering the transmission of a message to a remote unit upon said customer achieving said criteria in responding to said questions;
  (b) reaching said criteria thereby triggering said transmission;
  (c) receiving said transmission; and,
  (d) responding to said message by contacting said customer prior to said customer's departure from the service establishment.

9. The method of claim 8 wherein the remote unit is selected from the group consisting of at least one pager, at least one personal computer, or both.

10. The method of claim 8 wherein the step of programming with a set of criteria is selected from the group consisting of:
  (a) selecting certain survey responses, sets of responses, conditions, sets of conditions, threshold cumulative survey scores, or threshold survey sub-scores which would alert customer service personnel that a customer was particularly dissatisfied with their service experience;
  (b) selecting certain survey responses, sets of responses, conditions, sets of conditions, threshold cumulative survey scores, or threshold survey sub-scores which would alert customer service personnel that a customer was particularly satisfied with their service experience; and, combinations thereof.

11. The method of claim 10 wherein the step of responding further comprises the step of:
  (a) determining which set of criteria triggered the transmission; and
  (b) contacting said customer prior to said customer's departure from the service establishment with interaction appropriate for said message.

* * * * *